(12) United States Patent
Silvestrov et al.

(10) Patent No.: US 12,474,494 B2
(45) Date of Patent: Nov. 18, 2025

(54) METHOD TO DETERMINE A TIME-DEPTH MODEL

(71) Applicant: SAUDI ARABIAN OIL COMPANY, Dhahran (SA)

(72) Inventors: Ilya Silvestrov, Dhahran (SA); Andrey Bakulin, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 381 days.

(21) Appl. No.: 18/059,915

(22) Filed: Nov. 29, 2022

(65) Prior Publication Data

US 2024/0176037 A1    May 30, 2024

(51) Int. Cl.
| | | |
|---|---|---|
| *G01V 1/30* | (2006.01) | |
| *G01V 1/28* | (2006.01) | |
| *G01V 1/34* | (2006.01) | |

(52) U.S. Cl.
CPC .............. *G01V 1/308* (2013.01); *G01V 1/282* (2013.01); *G01V 1/345* (2013.01)

(58) Field of Classification Search
CPC ......... G01V 1/308; G01V 1/282; G01V 1/345
See application file for complete search history.

(56) References Cited

U.S. PATENT DOCUMENTS

| | | |
|---|---|---|
| 4,922,362 A | 5/1990 | Miller et al. |
| 4,926,391 A | 5/1990 | Rector et al. |
| 5,144,589 A | 9/1992 | Hardage |
| 5,511,038 A | 4/1996 | Angeleri et al. |
| 6,868,037 B2 | 3/2005 | Dasgupta et al. |

(Continued)

FOREIGN PATENT DOCUMENTS

| | | |
|---|---|---|
| CA | 2 770 232 A1 | 2/2011 |
| CN | 113514876 A | 10/2021 |
| CN | 113687418 A | 11/2021 |

OTHER PUBLICATIONS

Asgharzadeh, Mehdi et al., "Drill bit noise imaging without pilot trace, a near-surface interferometry example"; Solid Earth; vol. 10, Issue 4; pp. 1015-1023; 2019 (12 pages).

(Continued)

*Primary Examiner* — Elias Desta
(74) *Attorney, Agent, or Firm* — Osha Bergman Watanabe & Burton LLP

(57) ABSTRACT

Systems and methods are disclosed. The method includes drilling, using a drill bit, a wellbore to a sequence of drilling depths within a subterranean region of interest. The method further includes, for each drilling depth, obtaining a seismic dataset generated by the drill bit, determining a coherency map using the seismic dataset, a range of seismic velocities, a range of vertical traveltimes, and a geological model, determining a locus from the coherency map, defining an objective function based on the locus, and determining a unique seismic velocity and a unique vertical traveltime based on an extremum of the objective function. The method further still includes generating a vertical traveltime, depth model using the unique seismic velocity and the unique vertical traveltime for each drilling depth, obtaining a time-domain surface seismic dataset, and determining a depth-domain surface seismic dataset using the time-domain surface seismic dataset and the vertical traveltime, depth model.

17 Claims, 9 Drawing Sheets

(56) References Cited

U.S. PATENT DOCUMENTS

| | | | | |
|---|---|---|---|---|
| 7,675,816 | B2* | 3/2010 | Mathiszik | G01V 1/42 702/14 |
| 7,730,967 | B2* | 6/2010 | Ballantyne | G01V 1/42 175/40 |
| 8,214,188 | B2 | 7/2012 | Bailey et al. | |
| 9,239,396 | B2 | 1/2016 | Thompson et al. | |
| 11,346,972 | B2* | 5/2022 | Al-Ali | G01V 1/50 |
| 2005/0178558 | A1 | 8/2005 | Kolle et al. | |
| 2010/0305865 | A1 | 12/2010 | Bachrach et al. | |
| 2020/0233113 | A1 | 7/2020 | Luo et al. | |

OTHER PUBLICATIONS

Bakulin, Andrey et al., "Seismic-while-drilling applications from the first DrillCAM trial with wireless geophones and instrumented top drive"; The Leading Edge; vol. 39, Issue 6; pp. 422-429; Jun. 2020 (8 pages).

Dix, C. Hewitt et al., "Seismic Velocities From Surface Measurements"; Geophysics; vol. 20, Issue 1; pp. 68-86; Jan. 1955 (19 pages).

Koren, Zvi et al., "Constrained Dix inversion"; Geophysics; vol. 71, Issue 6; pp. R113-R130; Nov.-Dec. 2006 (18 pages).

Poletto, Flavio et al., "Seismic While Drilling Fundamentals of Drill-Bit Seismic for Exploration"; Elsevier; Handbook of Geophysical Exploration: Seismic Exploration; vol. 35; Chapter 1: Introduction and overview; pp. 1-25; 2004 (25 pages).

Poletto, Flavio et al., "Seismic While Drilling Fundamentals of Drill-Bit Seismic for Exploration"; Elsevier; Handbook of Geophysical Exploration: Seismic Exploration; vol. 35; Chapter 8: Applications; pp. 393-468; 2004 (76 pages).

Schlumberger Limited, "drill-noise vertical seismic profile"; <https://glossary.slb.com/en/terms/d/drill-noise_vertical_seismic_profile>; Accessed Aug. 8, 2024 (2 pages).

Haris, A et al., "Drilling exploration design controlled by pore pressure prediction from 2D seismic and well data: case study of South Sumatra Basin"; IOP Conference Series: Earth and Environmental Science; vol. 62, Article 012017; pp. 1-6; 2017 (6 pages).

\* cited by examiner

602
DRILL A WELLBORE TO A SEQUENCE OF DRILLING DEPTHS WITHIN A SUBTERRANEAN REGION OF INTEREST, WHERE THE SEQUENCE OF DRILLING DEPTHS IS ARRANGED IN ORDER OF INCREASING DEPTH ALONG THE WELLBORE, WHERE THE WELLBORE FOLLOWS A WELLBORE PATH.

FOR EACH DRILLING DEPTH AMONG THE SEQUENCE OF DRILLING DEPTHS:

604
OBTAIN A SEISMIC DATASET THAT INCLUDES SEISMIC TRACES, WHERE EACH OF THE SEISMIC TRACES IS GENERATED BY A DRILL BIT DRILLING THE WELLBORE AND RECORDED BY EACH OF SEISMIC RECEIVERS.

606
DETERMINE A COHERENCY MAP USING THE SEISMIC DATASET, A RANGE OF SEISMIC VELOCITIES, A RANGE OF VERTICAL TRAVELTIMES, AND A NORMAL MOVEOUT EQUATION WHERE EACH POSITION ON THE COHERENCY MAP CORRESPONDS TO A SEISMIC VELOCITY AMONG THE RANGE OF SEISMIC VELOCITIES AND A VERTICAL TRAVELTIME AMONG THE RANGE OF VERTICAL TRAVELTIMES, WHERE EACH POSITION ON THE COHERENCY MAP REPRESENTS A MEASURE OF SIMILARITY WITHIN THE SEISMIC TRACES CORRECTED USING THE SEISMIC VELOCITY, THE VERTICAL TRAVELTIME, AND THE NORMAL MOVEOUT EQUATION.

608
DETERMINE A LOCUS FROM THE COHERENCY MAP, WHERE THE LOCUS INCLUDES EXTREMUMS OF THE MEASURE OF SIMILARITY, WHERE THE LOCUS CORRESPONDS TO SEISMIC VELOCITIES AMONG THE RANGE OF SEISMIC VELOCITIES AS A FUNCTION OF VERTICAL TRAVELTIMES AMONG THE RANGE OF VERTICAL TRAVELTIMES.

610
DEFINE AN OBJECTIVE FUNCTION BASED, AT LEAST IN PART, ON THE LOCUS AND A MEASURED DEPTH INTERVAL, WHERE THE MEASURED DEPTH INTERVAL INCLUDES A DIFFERENCE BETWEEN TWO DRILLING DEPTHS AMONG THE SEQUENCE OF DRILLING DEPTHS.

612
DETERMINE A UNIQUE VERTICAL TRAVELTIME AMONG THE VERTICAL TRAVELTIMES AND A UNIQUE SEISMIC VELOCITY AMONG THE SEISMIC VELOCITIES BASED, AT LEAST IN PART, ON AN EXTREMUM OF THE OBJECTIVE FUNCTION.

METHOD TO DETERMINE A TIME-DEPTH MODEL

BACKGROUND

A surface seismic survey may be used to determine the depth of geological features within a subterranean region of interest by generating seismic waves that propagate into the subterranean region of interest. The seismic waves may be recorded as seismic traces. Seismic traces may present in a time domain making it difficult to access the depth of the geological features within the subterranean region of interest. A time-depth model may be used to convert the seismic traces from a time domain to a depth domain. The depth-domain seismic traces may be interpreted to identify the depth of the geological features within the subterranean region of interest. Identification of the depth of the geological features may then be used to revise a wellbore path as a wellbore is being drilled.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method. The method includes drilling, using a drill bit, a wellbore to a sequence of drilling depths within a subterranean region of interest. The method further includes, for each drilling depth, obtaining a seismic dataset generated by the drill bit, determining a coherency map using the seismic dataset, a range of seismic velocities, a range of vertical traveltimes, and a geological model, determining a locus from the coherency map, defining an objective function based on the locus, and determining a unique seismic velocity and a unique vertical traveltime based on an extremum of the objective function. The method further still includes generating a vertical traveltime, depth model using the unique seismic velocity and the unique vertical traveltime for each drilling depth, obtaining a time-domain surface seismic dataset, and determining a depth-domain surface seismic dataset using the time-domain surface seismic dataset and the vertical traveltime, depth model.

In general, in one aspect, embodiments relate to a non-transitory computer-readable memory storing instructions to perform steps executable by a computer processor. The steps include, for each drilling depth among a sequence of drilling depths, receiving a seismic dataset generated by a drill bit drilling a wellbore to the sequence of drilling depths within a subterranean region of interest, determining a coherency map using the seismic dataset, a range of seismic velocities, a range of vertical traveltimes, and a geological model, determining a locus from the coherency map, forming an objective function based on the locus, and determining a unique seismic velocity and a unique vertical traveltime based on an extremum of the objective function. The steps further include generating a vertical traveltime, depth model using the unique seismic velocity and the unique vertical traveltime for each drilling depth, receiving a time-domain surface seismic dataset, and determining a depth-domain surface seismic dataset using the time-domain surface seismic dataset and the vertical traveltime, depth model.

In general, in one aspect, embodiments relate to a system. The system includes a drilling system, a plurality of seismic receivers, and a computer processor. The drilling system includes a drill bit and is configured to drill a wellbore to a sequence of drilling depths within a subterranean region of interest. The plurality of seismic receivers is configured to record a seismic dataset comprising a plurality of seismic traces generated by the drill bit. The computer processor is configured to, for each drilling depth, receive the seismic dataset, determine a coherency map using the seismic dataset, a range of seismic velocities, a range of vertical traveltimes, and a geological model, determine a locus from the coherency map, form an objective function based on the locus, and determine a unique seismic velocity and a unique vertical traveltime based on an extremum of the objective function. The computer processor is further configured to generate a vertical traveltime, depth model using the unique seismic velocity and the unique vertical traveltime for each drilling depth, receive a time-domain surface seismic dataset, and determine a depth-domain surface seismic dataset using the time-domain surface seismic dataset and the vertical traveltime, depth model.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
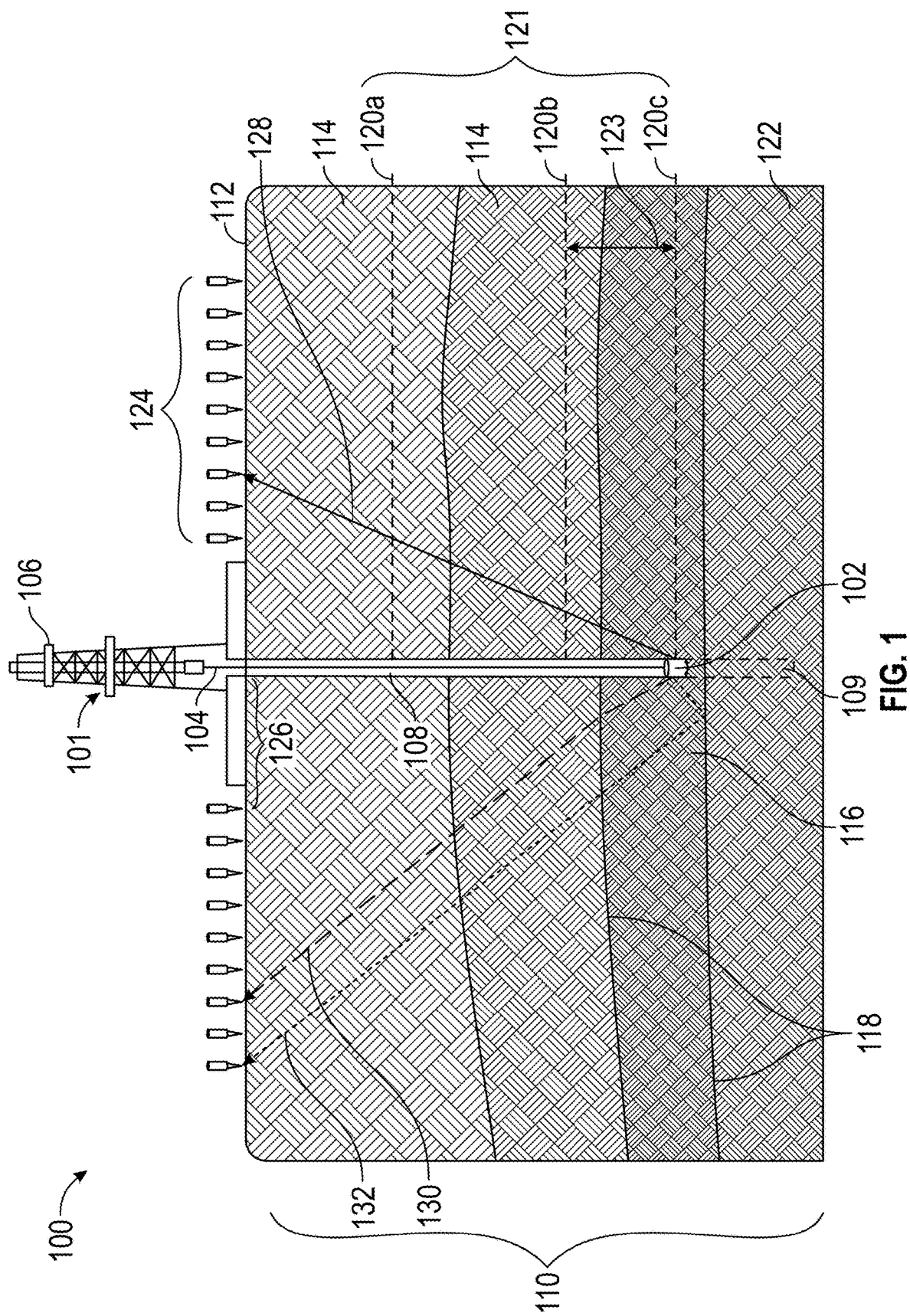
FIG. 1 illustrates a seismic-while-drilling survey in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a seismic trace" includes reference to one or more of such trace.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-8, any component described regarding a figure, in various embodiments disclosed herein, may be equivalent to one or more like-named components described regarding any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described regarding a corresponding like-named component in any other figure.

A time-depth model may be used to transform a surface seismic dataset from a time domain to a depth domain. Following transformation, a depth-domain seismic dataset may be interpreted to determine the depth of geological features within a subterranean region of interest. Traditionally, a time-depth model may be determined using a wireline deployed downhole following drilling of a portion of a wellbore, using downhole seismic receivers and surface seismic sources, or using a surface seismic dataset. However, these traditional methods may require drilling to pause, not allow for the wellbore path of the wellbore to be re-evaluated, and/or result in a low-resolution time-depth model. Systems and methods are disclosed to determine a time-depth model that mitigates one or more of these challenges, among others. Systems include a drilling system and surface seismic receivers. Methods include seismic datasets that include seismic traces generated by a drill bit drilling the wellbore, a normal moveout equation, and coherency maps. The systems and methods may provide a time-depth model with increased certainty as to the depth of geological features. Further, the time-depth model may be determined during the drilling of the wellbore and used to re-evaluate the wellbore path of the wellbore as the wellbore is being drilled. As such, the systems and methods may be an improvement over traditional methods.

FIG. 1 illustrates a seismic-while-drilling (SWD) survey in accordance with one or more embodiments. The SWD survey (100) includes a drilling system (101) configured to drill a wellbore (108) along a wellbore path (109). The drilling system (101) may include a drill bit (102), a drillstring (104), and a rig (106) among other components. A wellbore (108) may be drilled along the wellbore path (109) within a subterranean region of interest (110) using the drill bit (102) attached to the drillstring (104) further attached to the rig (106). The rig (106) may be located on the surface of the earth (112). The drillstring (104) may both support the drill bit (102) and provide electrical power to the drill bit (102). The drill bit (102) may drill the wellbore (108) along the wellbore path (109) by drilling to a sequence of drilling depths (121). Each drilling depth (120a-c) among the sequence of drilling depths (121) may be known with a high level of certainty by monitoring the length of the drillstring (104) downhole in the wellbore (108).

Once drilling is complete, the wellbore (108) may traverse a plurality of overburden layers (114), which may include a cap-rock layer (116), and geological discontinuities (118) to penetrate a hydrocarbon reservoir (122). Hereinafter, the overburden layers (114), geological discontinuities (118), and a hydrocarbon reservoir (122) are all considered "geological features."

During a SWD survey (100), seismic receivers (124) may be positioned on the surface of the earth (112). Each seismic receiver (124) may be some horizontal distance h away from the wellbore (108). Hereinafter, the horizontal distance h for each seismic receiver (124) is denoted "receiver offset" (126).

During the SWD survey (100), the drill bit (102) acts as a seismic source that generates seismic waves in the subterranean region of interest (110) as the drill bit (102) drills the wellbore (108) to the sequence of drilling depths (121). The seismic waves may take a variety of paths. Some seismic waves may propagate directly to seismic receivers (124) as direct seismic waves (128). Other seismic waves may refract and/or reflect at geological discontinuities (118) to produce refracted seismic waves (130) and/or reflected seismic waves (132) that then propagate to seismic receivers (124). The direct seismic waves (128), refracted seismic waves (130), and reflected seismic waves (132) are detected and recorded by each seismic receiver (124) in the form of a time series denoted a "seismic trace." Each seismic trace may record an amplitude of the seismic waves at discrete times based on a time sampling rate. Each seismic receiver (124) may be configured to detect and record a continuous or semi-continuous seismic trace as the drill bit (102) drills deeper and deeper into the subterranean region of interest (110).

Figure 2:
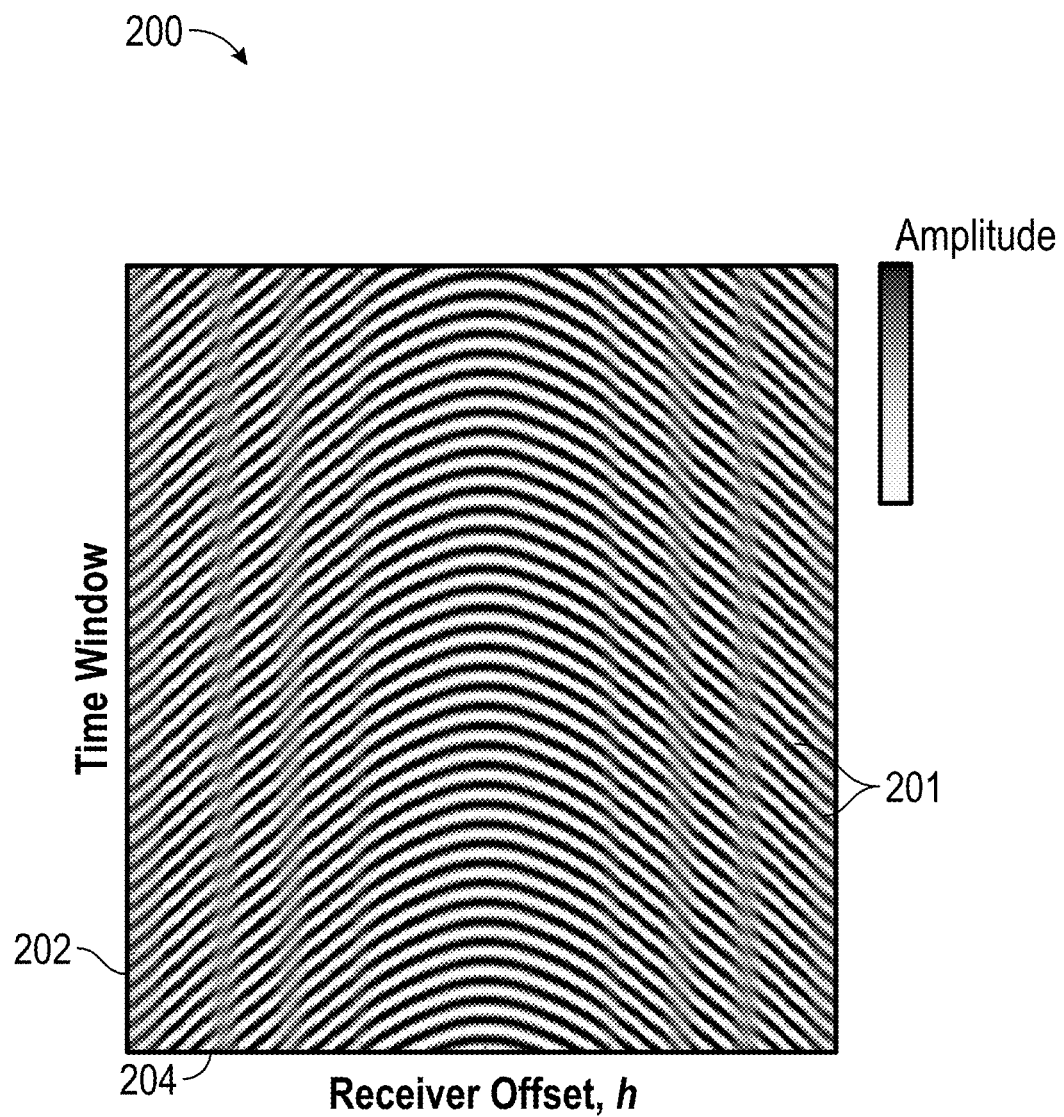
FIG. 2 shows a seismic dataset in accordance with one or more embodiments.

Hereinafter, the continuous or semi-continuous seismic waves generated by the drill bit (102) drilling the wellbore (108) and recorded by seismic receivers (124) as seismic traces for a drilling depth (120a-c) is denoted a "seismic dataset." FIG. 2 illustrates a seismic dataset (200) in accordance with one or more embodiments. The seismic traces (201) within a seismic dataset (200) may be recorded by seismic receivers (124) over a time window as shown along the ordinate (202). The size of the time window may depend on the quality of the seismic dataset (200) and the rate of penetration of the drill bit (102). The size of the time window may range from seconds to hours. The abscissa (204) denotes receiver offset h (126). The amplitude of the seismic waves is shown by the grayscale bar.

In some embodiments, the seismic dataset (200) may be processed, which may include frequency filtering, the application of frequency-wavenumber methods, and/or stacking to remove noise, such as drilling noise among other types of noise.

A seismic dataset (200) may be further processed to determine a "vertical traveltime, depth model." Hereinafter, a vertical traveltime, depth model may be referred to as simply a "time-depth model." In the context of this disclosure, the vertical traveltime in the time-depth model may be the time it would take for seismic waves to propagate from the drill bit (102) vertically to the surface of the earth (112). Further, the depth in the time-depth model is the drilling depth (120a-c) of the drill bit (102). The time-depth model relates the vertical traveltime and the drilling depth (120a-c). In some embodiments, a time-depth model may be used to convert a surface seismic dataset from a surface seismic survey from a two-way time domain (hereinafter "time domain") to a depth domain. A depth of geological features may then be identified with a high level of certainty within the subterranean region of interest (110) using the surface seismic dataset in the depth domain.

Traditionally, a time-depth model may be determined from the SWD survey (100) by cross-correlating seismic traces (201) with or deconvolving seismic traces (201) from a pilot signal. The pilot signal may be recorded by a pilot receiver along the length of the drillstring (104). After cross-correlation or deconvolution, the SWD survey (100) may be considered a reversed traditional vertical seismic profile (VSP) survey. For reference, in traditional VSP surveys, the seismic source located on the surface of the earth (112) may generate discrete seismic waves that are detected and recorded by seismic receivers (124) downhole.

Determining a time-depth model using a seismic dataset (200) generated by a drill bit (102) drilling a wellbore (108) may reduce acquisition time and cost. For example, a pilot signal and, thus, a pilot receiver may no longer be needed. Further, a traditional seismic source may no longer be needed. Further still, seismic receivers (124) may not need to be deployed downhole.

To determine a time-depth model from seismic datasets (200) acquired during a SWD survey (100), vertical traveltimes $T_n$ within the time-depth model may be estimated based on a NMO equation. A NMO equation may be used to correct seismic traces (201) within a seismic dataset (200) for varying receiver offsets h (126).

An NMO equation that describes a difference in time d t between seismic waves arriving at a seismic receiver (124) located at a receiver offset h (126) relative to seismic waves that arrive at a zero-offset location may be:

$$\Delta t(h) = -T_n + \sqrt{T_n^2 + \frac{h^2}{V_{RMS_n}^2}}, \quad \text{Equation (1)}$$

where $T_n$ is the vertical traveltime of the seismic waves propagating from the drill bit (102) at a drilling depth (120a-c) vertically to the surface of the earth (112) and $V_{RMS_n}$ is the root-mean-square velocity. Root-mean-square velocity may be the square root of the sum of the squares of interval velocities in the layers multiplied by the traveltimes in these layers divided by the total vertical traveltime.

Figure 3:
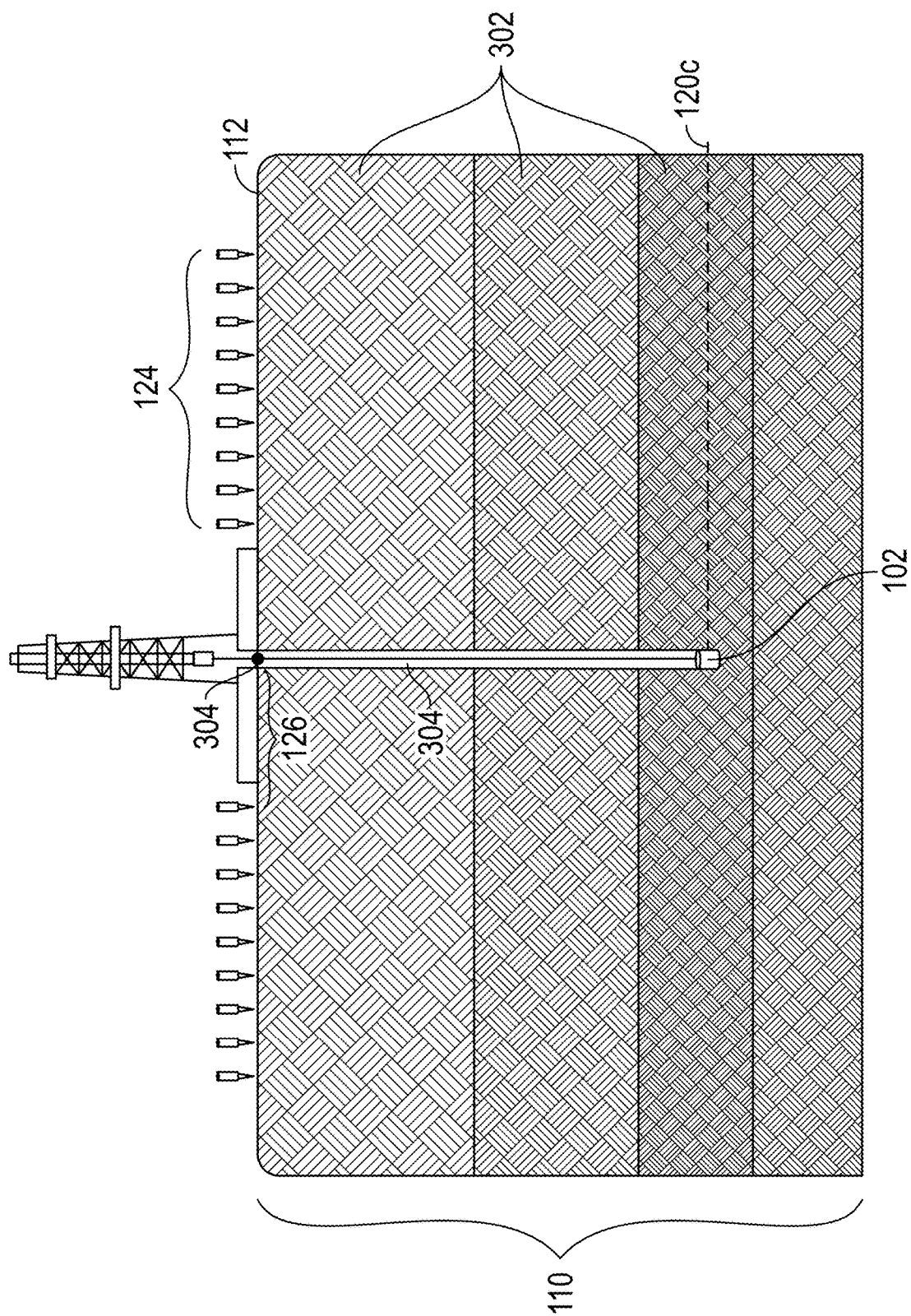
FIG. 3 illustrates assumptions of a normal moveout equation in accordance with one or more embodiments.

As shown by FIG. 3, the NMO equation presented in Equation (1) may assume horizontal overburden layers (302) and a vertical wellbore (304) within the subterranean region of interest (110). Equation (1) may also assume a short spread approximation regarding the receiver offset h (126) of the seismic receivers (124) located along the surface of the earth (112). A person of ordinary skill in the art will appreciate that other NMO equations with the same or different parameters and/or with the same or different assumptions as shown in FIG. 3 may be used without departing from the scope of the invention. For example, other NMO equations may assume non-horizontal overburden layers (114), non-vertical wellbores (108), and/or larger receiver offsets h (126).

In the NMO equation described by Equation (1), the vertical traveltime $T_n$ and the root-mean-square velocity $V_{RMS_n}$ are both unknown values. A measure of similarity may be used to determine these unknown values. In some embodiments, the measure of similarity may be semblance. Semblance S may be defined as:

$$S = \frac{\sum_{i=1}^{N} \left( \sum_{j=1}^{M} d_{ij} \right)^2}{M \sum_{i=1}^{N} \sum_{j=1}^{M} d_{ij}^2}, \quad \text{Equation (2)}$$

where $d_{ij}$ is the amplitude of a seismic trace (201) at a discrete time i for a seismic receiver j (124), M is the total number of seismic receivers (124), which may be the same as the number of seismic traces (201), and N is the number of discrete time samples that record a seismic trace (201). A person of ordinary skill in the art will appreciate that other measures of similarity, such as cross-correlation and multiple signal classification (MUSIC) measures, may be used.

A measure of similarity S may be determined between seismic traces (201) within a seismic dataset (200) following the correction of the seismic traces (201) using an assumed value of traveltime $T_n$ and an assumed value of root-mean-square velocity $V_{RMS_n}$. This process may be repeated for a range of assumed traveltimes $T_n$ and a range of assumed root-mean-square velocities $V_{RMS_n}$. In some embodiments, the range of traveltimes $T_n$ may include all possible traveltimes $T_n$ and the range of root-mean-square velocities $V_{RMS_n}$ may include all possible root-mean-square velocities $V_{RMS_n}$.

Figure 4:
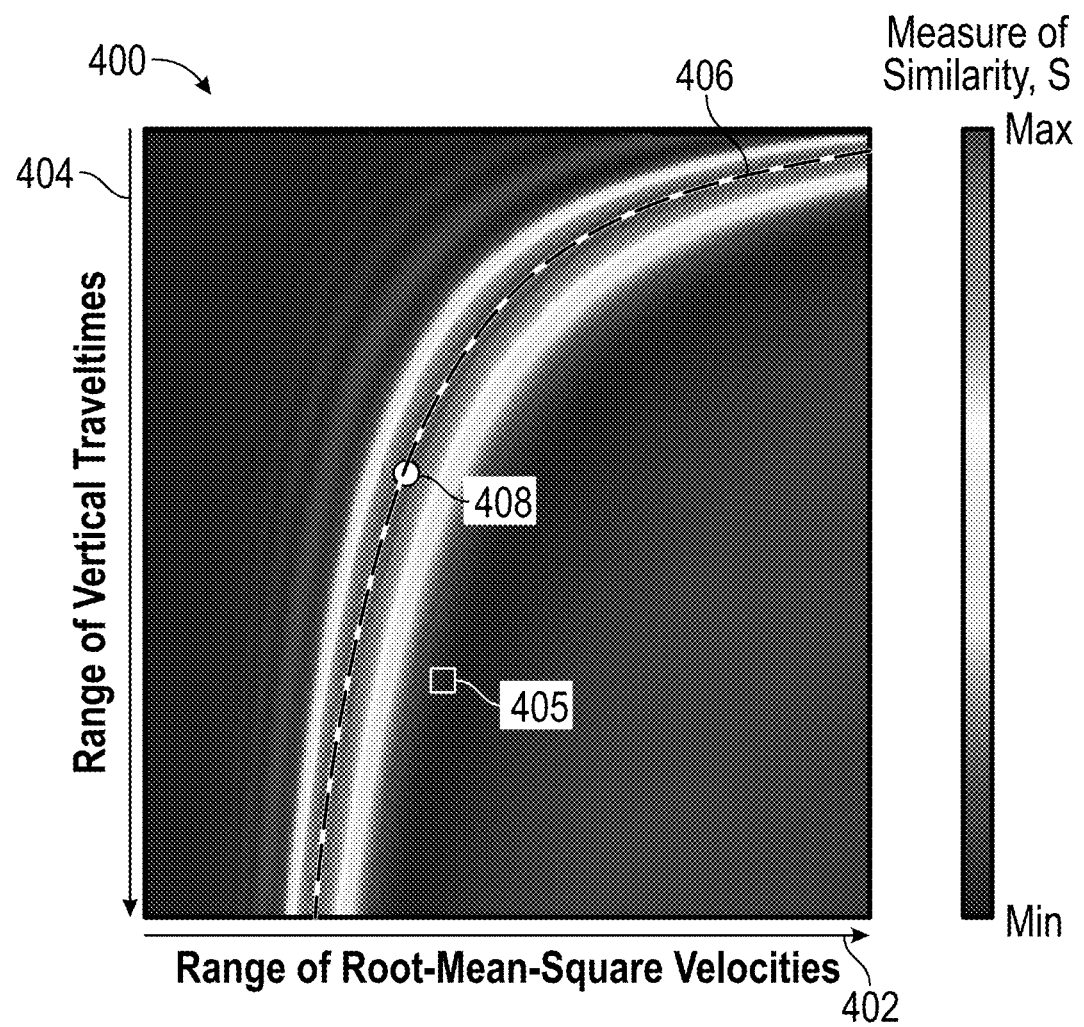
FIG. 4 shows a coherency map in accordance with one or more embodiments.

The measure of similarity S determined for each of the range of vertical traveltimes $T_n$ and each of the range of root-mean-square velocities $V_{RMS_n}$ may be presented as a coherency map (400). FIG. 4 displays a coherency map (400) in accordance with one or more embodiments. The range of root-mean-square velocities $V_{RMS_n}$ presents on the abscissa (402). The range of vertical traveltimes $T_n$ presents on the ordinate (404). The measure of similarity S is shown in grayscale. Thus, each position (405) on the coherency map (400) corresponds to a root-mean-square velocity $V_{RMS_n}$ among the range of root-mean-square velocities $V_{RMS_n}$, a traveltime $T_n$ among the range of traveltimes $T_n$, and a measure of similarity S.

The coherency map (400) may present a locus (406) or multiple extremums of the measure of similarity S. In some embodiments, the locus (406) may be determined by finding the maximum measure of similarity S for each traveltime $T_n$ among the range of traveltimes $T_n$. The locus (406) may define root-mean-square velocity $V_{RMS_n}$ as a function of traveltime denoted $V_{RMS_n}(T_n)$. The unique vertical traveltime $T_n^*$ and unique root-mean-square velocity $V_{RMS_n}^*$ may reside along the locus as shown by the unique position (408).

In some embodiments, the unique vertical traveltime $T_n^*$ and unique root-mean-square velocity $V_{RMS_n}^*$ along the locus (406) may be determined using a Dix formula:

$$V_{INT_n}^2 = (V_{RMS_n}^2 T_n - V_{RMS_{n-1}}^2 T_{n-1})/(T_n - T_{n-1}), \quad \text{Equation (3)}$$

where n denotes the current drilling depth (120c) of the drill bit (102), n−1 denotes the previous shallower drilling depth ($120b$) of the drill bit ($102$), and $V_{INT_n}$ is the interval velocity between the two drilling depths ($120b, c$). The Dix formula may be modified by multiplying Equation (3) by ($T_n-T_{n-1}$):

$$\Delta z_n^2 = (V_{RMS_n}^2 T_n - V_{RMS_{n-1}}^2 T_{n-1}) \cdot (T_n - T_{n-1}), \quad \text{Equation (4)}$$

where $\Delta z_n$ is a measured depth interval ($123$) between the current drilling depth ($120c$) and the previous shallower drilling depth ($120b$) as shown in FIG. 1. Equation (4) may be used as an "objective function."

In some embodiments, the unique vertical traveltime $T_n$* may be determined by replacing $V_{RMS_n}$ with the locus ($406$) $V_{RMS_n}(T_n)$ and minimizing a rearranged Equation (4):

$$\min_{T_n} \left| \Delta z_n - \sqrt{\left( (V_{RMS_n}(T_n))^2 T_n - V_{RMS_{n-1}}^2 T_{n-1} \right) \cdot (T_n - T_{n-1})} \right|. \quad \text{Equation (5)}$$

The unique vertical traveltime $T_n$* may be determined using Equation (5) for each successively deeper drilling depth ($120a$-$c$) in series. Note that the shallowest drilling depth may be at the surface of the earth ($112$) where $T_0=0$. In this special first case, Equation (5) may reduce to:

$$\min_{T_1} \left| z_1 - V_{RMS_1}(T_1) \cdot T_1 \right|. \quad \text{Equation (6)}$$

Equations (5) and (6) may be used to determine the unique vertical traveltime $T_n$* for each successively deeper drilling depth ($120a$-$c$) using the previously determined unique vertical traveltime $T_{n-1}$* and unique root-mean-square velocity $V_{RMS_{n-1}}$*.

Figure 5:
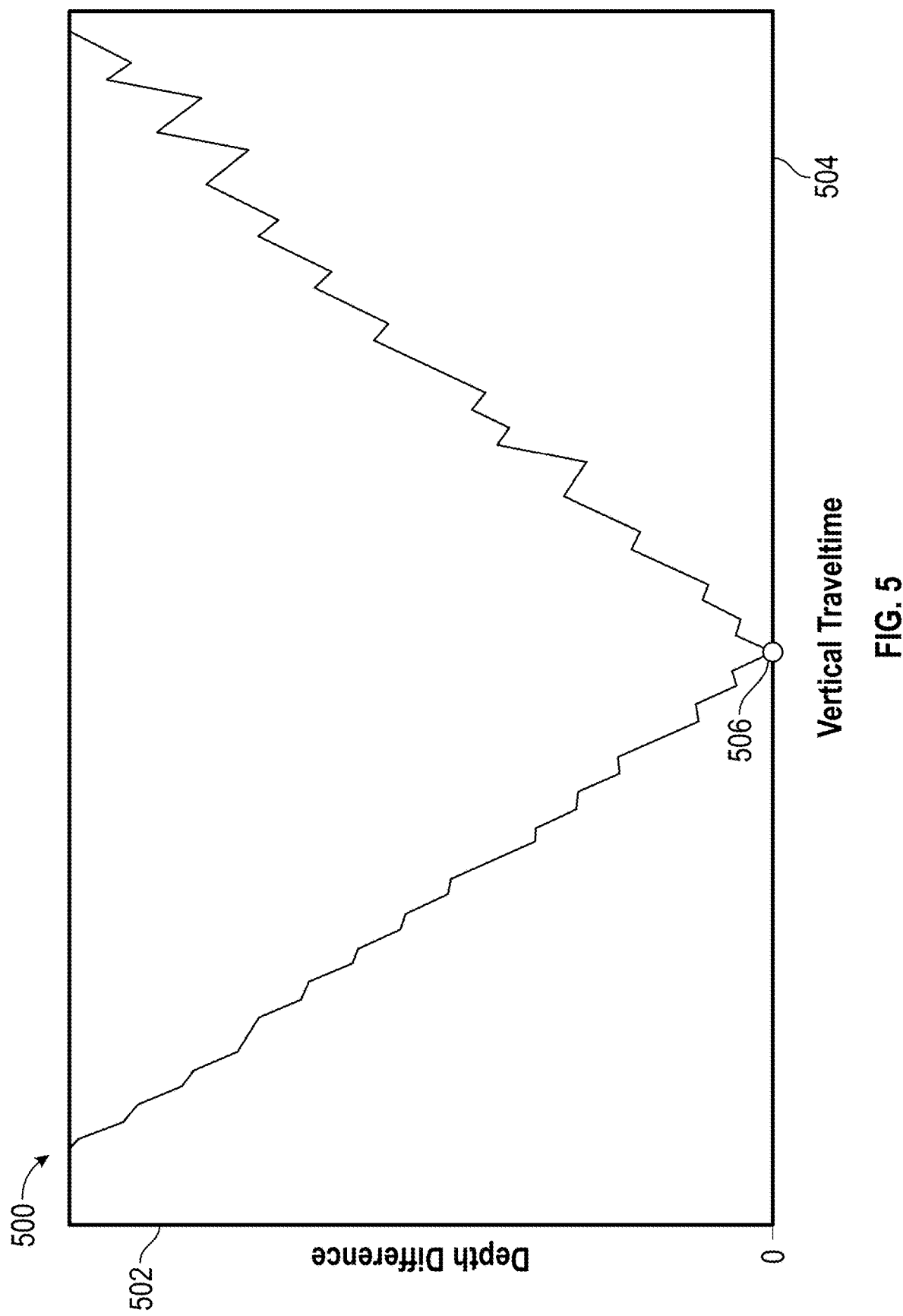
FIG. 5 shows an objective function in accordance with one or more embodiments.

FIG. 5 illustrates the minimization of an objective function ($500$) in accordance with one or more embodiments. FIG. 5 may illustrate Equations (5) or (6). In some embodiments, the ordinate ($502$) presents $|z_1-V_{RMS_1}(T_1) \cdot T_1|$ from Equation (5), denoted "depth difference," and the abscissa ($504$) presents vertical traveltime $T_1$. The vertical traveltime at the minimum depth difference is the unique vertical traveltime $T_n$* ($506$). The unique vertical traveltime $T_n$* ($506$) may then be used to determine the unique root-mean-square velocity $V_{RMS_n}$* from the locus ($406$). In other embodiments, Dix inversion may be used to determine the unique vertical traveltime $T_n$* ($506$) at each drilling depth ($120a$-$c$) simultaneously.

Following the determination of the unique vertical traveltime $T_n$* ($506$) for each drilling depth ($120a$-$c$), each unique vertical traveltime $T_n$* ($506$) and the associated drilling depth ($120a$-$c$) may be paired to determine a time-depth model.

Figure 6:
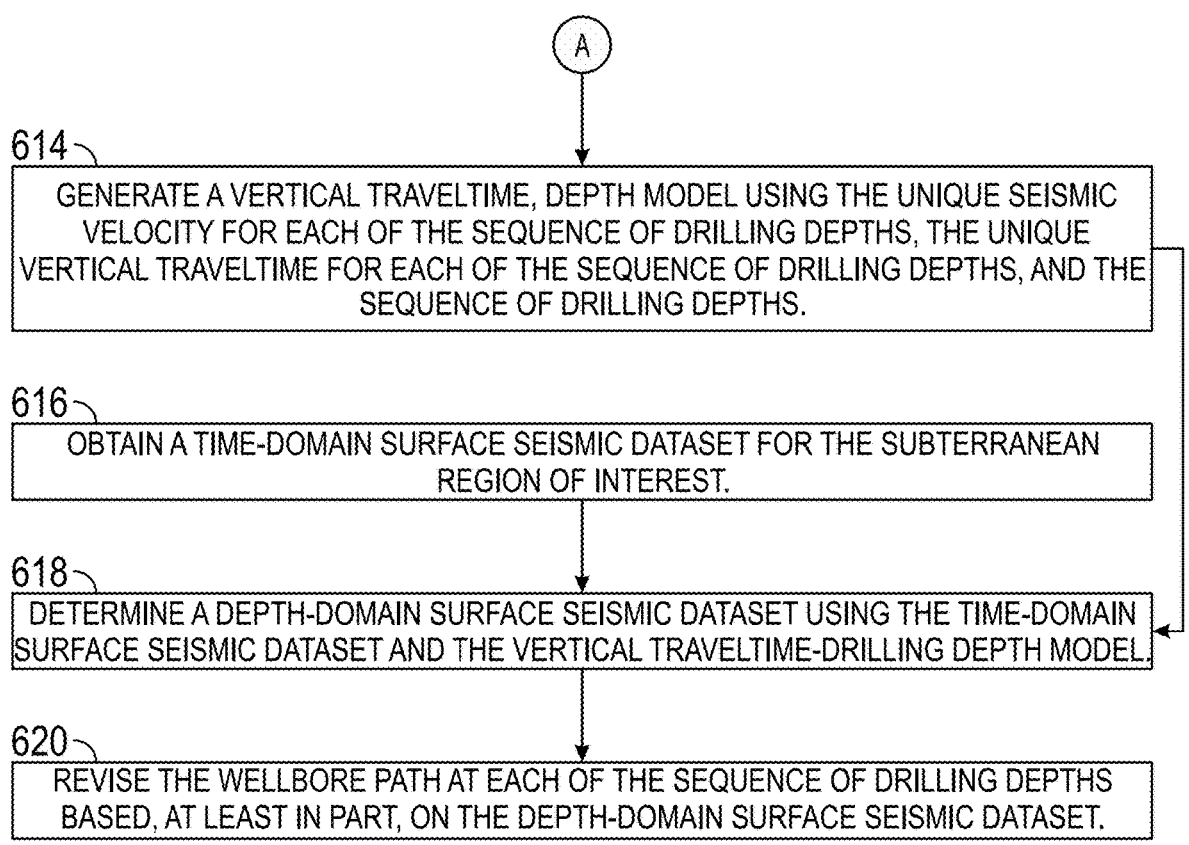
FIG. 6 shows a flowchart in accordance with one or more embodiments.

FIG. 6 shows a flowchart to determine a time-depth model in accordance with one or more embodiments. In step $602$, a wellbore ($108$) is drilled to a sequence of drilling depths ($121$) within a subterranean region of interest ($110$) as illustrated in FIG. 1. The sequence of drilling depths ($121$) may be ordered by increasing depth along the wellbore ($108$). Further, the wellbore ($108$) being drilled may follow a wellbore path ($109$).

In step $604$, a seismic dataset ($200$) is obtained for each of the sequence of drilling depths ($121$). Each seismic dataset ($200$), one of which is displayed in FIG. 2, includes seismic traces ($201$) generated by a drill bit ($102$) drilling the wellbore ($108$). Each seismic trace ($201$) is recorded by each of numerous seismic receivers ($124$) located on the surface of the earth ($112$). The seismic dataset ($200$) for each drilling depth ($120a$-$c$) may include the seismic traces ($201$) recorded over a time window. The seismic traces ($201$) within the seismic dataset ($200$) may present NMO due to varying receiver offsets h ($126$).

In step $606$, a coherency map ($400$) is determined using a seismic dataset ($200$), a range of vertical traveltimes, a range of seismic velocities, and a NMO equation. In some embodiments, the NMO equation may be Equation (1) where the vertical traveltime and the seismic velocity are unknown. Note that while Equation (1) includes root-mean-square velocity, seismic velocity $V_n$ will be used hereinafter to generically denote any velocity. In other embodiments, equations other than Equation (1) may be used where other velocities are unknown. Further, while Equation (1) assumes horizontal overburden layers ($302$) and a vertical wellbore ($304$) as shown in FIG. 3, other equations that assume non-horizontal overburden layers ($114$) and a non-vertical wellbore ($108$) may be used. Further, equations that do not assume a short spread approximation may be used.

In some embodiments, the range of vertical traveltimes $T_n$ may be all possible traveltimes and the range of seismic velocities $V_n$ may be all possible velocities. In other embodiments, each range may be a subset of possible values. Each position ($405$) on the coherency map ($400$) may correspond to a traveltime $T_n$ among the range of traveltimes, a seismic velocity $V_n$ among the range of seismic velocities, and a measure of similarity. The measure of similarity at each position ($405$) may be determined between seismic traces ($201$) within each seismic dataset ($200$) once the seismic traces ($201$) have been corrected for NMO using the corresponding traveltime $T_n$ and the seismic velocity $V_n$ at that position ($405$). The measure of similarity may be, but is not limited to, semblance, as described by Equation (2), cross-correlation, and MUSIC measures.

In step $608$, a locus ($406$) is determined from the coherency map ($400$). The locus ($406$) may be multiple extremums of the measure of similarity as illustrated in FIG. 4. In some embodiments, the locus ($406$) may be determined from the coherency map ($400$) by finding the extremum of the measure of similarity for each traveltime among the range of traveltimes. In other embodiments, the locus ($406$) may be determined from the coherency map ($400$) by finding the extremum of the measure of similarity for each seismic velocity among the range of seismic velocities. The locus ($406$) may correspond to traveltimes within the range of traveltimes and seismic velocities within the range of seismic velocities that are most likely to adequately correct the seismic traces ($201$) within a seismic dataset ($200$) for NMO based on the measure of similarity. Further, the locus ($406$) may determine the most likely seismic velocities as a function of the most likely vertical traveltimes.

In step $610$, an objective function ($500$) is defined. The objective function ($500$) may be a Dix function, described by Equation (3), modified to include a measured depth interval $\Delta z_n$ ($123$). The measured depth interval $\Delta z_n$ ($123$) may be the difference in depth between a current drilling depth ($120c$) and a previous shallower drilling depth ($120b$). In some embodiments, the modified Dix function may be Equation (4). In other embodiments, the objective function ($500$) may be a least-squares difference function. The objective function ($500$) may include the locus ($406$). A person of ordinary skill in the art will appreciate that other objective functions ($500$) may be used.

In step $612$, a unique vertical traveltime $T_n$* among the traveltimes $T_n$ along the locus ($406$) is determined. In some embodiments, the unique vertical traveltime TT may be determined by minimizing or maximizing the modified Dix function as given in Equations (5) and (6) where Equation (6) is a special case used for the shallowest drilling depth (120a) below the surface of the earth (112). In other embodiments, a least-square objective function (500) may be minimized or maximized along the locus (406). Following the determination of the unique vertical traveltime $T_n^*$, the locus (406) may be used to determine the unique seismic velocity $V_n^*$ from the unique vertical traveltime $T_n^*$.

Steps 604, 606, 608, 610, and 612 may be repeated in series for each drilling depth (120a-c) among the sequence of drilling depths (121) in order of increasing depth. In some embodiments, the unique vertical traveltime $T_{n-1}^*$ and unique seismic velocity $V_{n-1}^*$, determined from the previous drilling depth (120b) may be used to determine the unique vertical traveltime $T_n^*$ and unique velocity $V_n^*$ for the current drilling depth (120c), such as if Equation (5) is being used. In other embodiments, steps 604, 606, 608, 610, and 612 may be performed for each drilling depth (120a-c) in parallel using inversion. Once steps 604, 606, 608, 610, and 612 have been performed for the sequence of drilling depths (121), a unique vertical traveltime $T_n^*$ has been determined for each drilling depth (120a-c) among the sequence of drilling depths (121).

Figure 7:
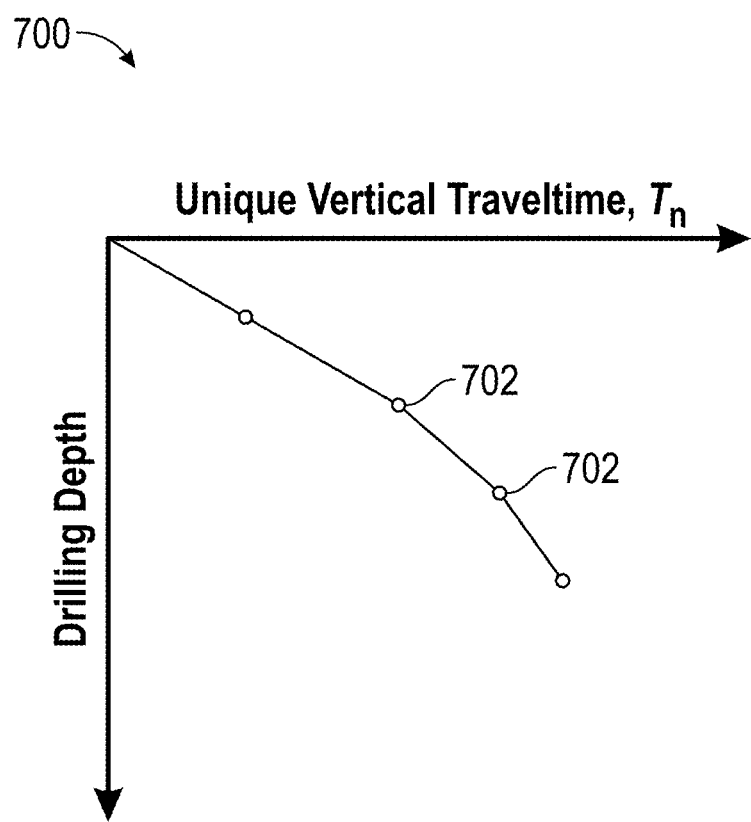
FIG. 7 shows a time-depth model in accordance with one or more embodiments.

In step 614, a time-depth model is generated. The time-depth model may be generated using the unique vertical traveltime $T_n^*$ for each drilling depth (120a-c) and the sequence of drilling depths (121). FIG. 7 illustrates a time-depth model (700) in accordance with one or more embodiments. The time-depth model (700) links the unique vertical traveltime $T_n^*$ to the corresponding drilling depth (120a-c) for which the unique vertical traveltime $T_n^*$ was determined for the sequence of drilling depths (121). While FIG. 7 shows a time-depth model (700) for four unique time-depth pairs (702), any number of unique time-depth pairs (702) may be used to generate a time-depth model (700).

Returning to FIG. 6, in step 616, a time-domain surface seismic dataset is obtained. In some embodiments, a surface seismic survey may use a seismic source, such as dynamite or a vibroseis truck, and seismic receivers, all of which are located on the surface of the earth (112), to generate and record seismic waves within the subterranean region of interest (110). The time-domain surface seismic dataset may include seismic traces (201) recorded in the time domain. The time-domain surface seismic dataset may be obtained prior to, during, or after steps 602 through 614 are performed.

In step 618, a depth-domain surface seismic dataset is determined. In some embodiments, the time-depth model (700) may be used to generate a velocity model. The velocity model may then be used to transform the surface seismic dataset from the time domain to a depth domain.

In step 620, the depth-domain surface seismic dataset may be used, at least in part, to revise the undrilled portion of the wellbore path (109). In some situations, the depth-domain surface seismic dataset may reduce uncertainties associated with the position of geological features with the subterranean region of interest (110) to ensure the wellbore (108) avoids hazards and adequately penetrates the hydrocarbon reservoir (122). In some embodiments, the depth-domain surface seismic dataset may be updated as the drilling system (101) drills deeper in the subterranean region of interest (110).

In some embodiments, the wellbore path (109) may be revised using a wellbore planning system. The wellbore planning system (800) may be specific software located on a memory (806) of a computer (802). The computer (802) will be described relative to FIG. 8. The wellbore planning system (800) may obtain the depth-domain surface seismic dataset with labeled geological features, such as overburden layers (114), geological discontinuities (118), faults, fractures, and a hydrocarbon reservoir (122). The wellbore planning system (800) may use the labeled depth-domain surface seismic dataset to revise the remaining, undrilled portion of the wellbore path (109). The revised wellbore path may be influenced by shallow drilling hazards, such as gas pockets, subterranean water flows, and/or unstable/metastable fault zones. The wellbore planning system (800) may define the revised wellbore path using wellbore caliper changes as a function of drilling depth (120a-c) and drilling parameters. Drilling parameters may include the planned drilling depths (120a-c) at which casing will be inserted. Casing may both support the wellbore (108) and prevent fluids within the subterranean region of interest (110) from entering the wellbore (108). Other drilling parameters may include the drilling mud weights and drilling mud types that may be used during the continued drilling of the wellbore (108).

The revised wellbore path may be transferred to the drilling system (101) described in FIG. 1. The drilling system (101) may continue drilling the wellbore (108) along the revised wellbore path to obtain additional seismic datasets (200) such that steps 602 through 620 described in FIG. 6 may be repeated to ultimately access and produce the hydrocarbon reservoir (122).

Figure 8:
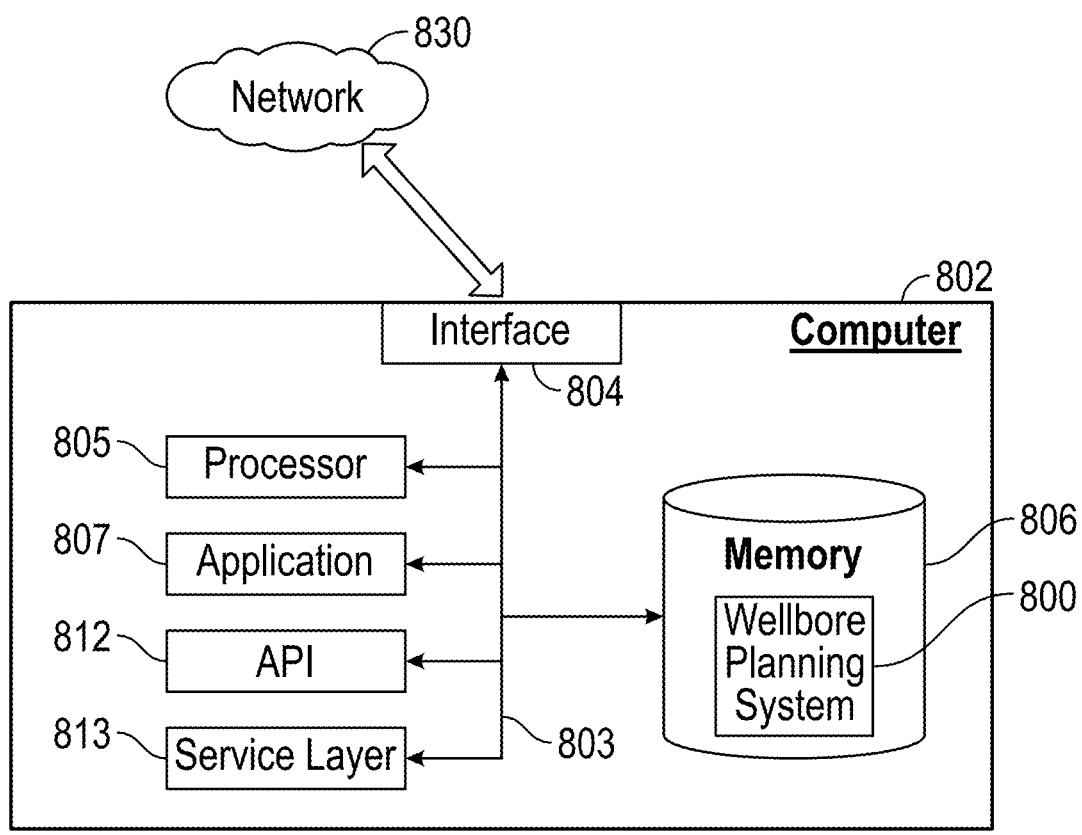
FIG. 8 illustrates a computer in accordance with one or more embodiments.

FIG. 8 depicts a block diagram of a computer system (802) used to provide computational functionalities associated with described algorithms, methods, functions, processes, flows, and procedures as described in this disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802)) and responding to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (813). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (812) or the service layer (813) as stand alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804) includes logic encoded in software or hardware (or a combination of software and hardware) and operable to communicate with the network (830). More specifically, the interface (804) may include software supporting one or more communication protocols, such as the Wellsite Information Transfer Specification (WITS) protocol, associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) also includes a memory (806) that holds data for the computer (802) or other components (or a combination of both) that can be connected to the network (830). For example, memory (806) store the wellbore planning system used to revise the wellbore path (109). Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing a computer (802), wherein each computer (802) communicates over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method comprising:
   obtaining a time-domain surface seismic dataset for a subterranean region of interest; and
   for each drilling depth among a sequence of drilling depths in order:
   drilling, using a drill bit, a wellbore to each drilling depth within the subterranean region of interest,
   wherein the sequence of drilling depths is arranged in order of increasing depth along the wellbore,
   wherein the wellbore follows a wellbore path, and
   wherein an orientation of the drill bit is based on the wellbore path,
   obtaining, using a plurality of seismic receivers, a seismic dataset comprising a plurality of seismic traces generated by the drill bit,
   determining, using a computer processor and using the seismic dataset, a range of seismic velocities, a range of vertical traveltimes, and a geological model, a coherency map comprising a plurality of positions,
   wherein each position on the coherency map corresponds to a seismic velocity among the range of seismic velocities and a vertical traveltime among the range of vertical traveltimes; and
   wherein each position on the coherency map represents a measure of similarity within the plurality of seismic traces corrected using the seismic velocity, the vertical traveltime, and the geological model, determining, using the computer processor, a locus from the coherency map,
   wherein the locus comprises a plurality of extremums of the measure of similarity,
   wherein the locus corresponds to seismic velocities among the range of seismic velocities as a function of vertical traveltimes among the range of vertical traveltimes,
defining an objective function based on the locus and a measured depth interval,
   wherein the measured depth interval comprises a difference between two drilling depths among the sequence of drilling depths,
determining, using the computer processor, a unique seismic velocity among the seismic velocities and a unique vertical traveltime among the vertical traveltimes based on an extremum of the objective function,
generating, using the computer processor, an updated vertical traveltime, depth model using the unique seismic velocity for at least two drilling depths among the sequence of drilling depths, the unique vertical traveltime for the at least two drilling depths, and the at least two drilling depths,
determining, using the computer processor, a depth-domain surface seismic dataset using the time-domain surface seismic dataset and the updated vertical traveltime, depth model,
revising, using the computer processor, the wellbore path based on the depth-domain surface seismic dataset, and
revising the orientation of the drill bit based on the revised wellbore path.

2. The method of claim 1, wherein the geological model assumes rock layers within the subterranean region of interest are horizontal.

3. The method of claim 1, wherein the measure of similarity comprises a semblance.

4. The method of claim 1, wherein determining the coherency map comprises a moveout correction based on a receiver location for each of the plurality of seismic receivers.

5. The method of claim 1, wherein the geological model comprises a three-dimensional model.

6. The method of claim 1, wherein the seismic velocity comprises a root-mean-square velocity.

7. The method of claim 1, wherein the objective function comprises a Dix formula modified to comprise the measured depth interval.

8. The method of claim 1, wherein the plurality of seismic traces for each drilling depth among the sequence of drilling depths is recorded over a time window.

9. A non-transitory computer-readable memory having computer-executable instructions stored thereon that, when executed by a computer processor, perform steps comprising:
receiving a time-domain surface seismic dataset for a subterranean region of interest;
for each drilling depth among a sequence of drilling depths in order:
   receiving a seismic dataset comprising a plurality of seismic traces generated by a drill bit drilling a wellbore to each drilling depth within the subterranean region of interest,
   wherein the sequence of drilling depths is arranged in order of increasing depth along the wellbore;
   wherein the wellbore follows a wellbore path;
   wherein an orientation of the drill bit is based on the wellbore path; and
   wherein each of the plurality of seismic traces is recorded by each of a plurality of seismic receivers,
determining, using the seismic dataset, a range of seismic velocities, a range of vertical traveltimes, and a geological model, a coherency map comprising a plurality of positions,
   wherein each position on the coherency map corresponds to a seismic velocity among the range of seismic velocities and a vertical traveltime among the range of vertical traveltimes; and
   wherein each position on the coherency map represents a measure of similarity within the plurality of seismic traces corrected using the seismic velocity, the vertical traveltime, and the geological model,
determining a locus from the coherency map,
   wherein the locus comprises a plurality of extremums of the measure of similarity; and
   wherein the locus corresponds to seismic velocities among the range of seismic velocities as a function of vertical traveltimes among the range of vertical traveltimes,
forming an objective function based on the locus and a measured depth interval,
   wherein the measured depth interval comprises a difference between two drilling depths among the sequence of drilling depths,
determining a unique seismic velocity among the seismic velocities and a unique vertical traveltime among the vertical traveltimes based on an extremum of the objective function,
generating an updated vertical traveltime, depth model using the unique seismic velocity for at least two drilling depths among the sequence of drilling depths, the unique vertical traveltime for the at least two drilling depths, and the at least two drilling depths,
determining a depth-domain surface seismic dataset using the time-domain surface seismic dataset and the updated vertical traveltime, depth model,
revising the wellbore path based on the depth-domain surface seismic dataset, and
revising the orientation of the drill bit based on the revised wellbore path.

10. The non-transitory computer-readable memory of claim 9, wherein the geological model assumes rock layers within the subterranean region of interest are horizontal.

11. The non-transitory computer-readable memory of claim 9, wherein the measure of similarity comprises a semblance.

12. The non-transitory computer-readable memory of claim 9, wherein determining the coherency map comprises a moveout correction based on a receiver location for each of the plurality of seismic receivers.

13. The non-transitory computer-readable memory of claim 9, wherein the geological model comprises a three-dimensional model.

14. The non-transitory computer-readable memory of claim 9, wherein the seismic velocity comprises a root-mean-square velocity.

15. The non-transitory computer-readable memory of claim 9, wherein the objective function comprises a Dix formula modified to comprise the measured depth interval.

16. The non-transitory computer-readable memory of claim 9, wherein the plurality of seismic traces for each drilling depth among the sequence of drilling depths is recorded over a time window.

17. A system comprising:
a computer processor configured to receive a time-domain surface seismic dataset for a subterranean region of interest;
for each drilling depth among a sequence of drilling depths in order:
a drilling system comprising a drill bit and configured to drill, using the drill bit, a wellbore to each drilling depth within the subterranean region of interest,
wherein the sequence of drilling depths is arranged in order of increasing depth along the wellbore,
wherein the wellbore follows a wellbore path, and
wherein an orientation of the drill bit is based on the wellbore path,
a plurality of seismic receivers configured to record a seismic dataset comprising a plurality of seismic traces generated by the drill bit,
wherein the computer processor is further configured to:
receive, from the plurality of seismic receivers, the seismic dataset;
determine, using the seismic dataset, a range of seismic velocities, a range of vertical traveltimes, and a geological model, a coherency map comprising a plurality of positions,
wherein each position on the coherency map corresponds to a seismic velocity among the range of seismic velocities and a vertical traveltime among the range of vertical traveltimes, and
wherein each position on the coherency map represents a measure of similarity within the plurality of seismic traces corrected using the seismic velocity, the vertical traveltime, and the geological model;
determine a locus from the coherency map,
wherein the locus comprises a plurality of extremums of the measure of similarity, and
wherein the locus corresponds to seismic velocities among the range of seismic velocities as a function of vertical traveltimes among the range of vertical traveltimes;
form an objective function based on the locus and a measured depth interval,
wherein the measured depth interval comprises a difference between two drilling depths among the sequence of drilling depths;
determine a unique seismic velocity among the seismic velocities and a unique vertical traveltime among the vertical traveltimes based on an extremum of the objective function;
generate an updated vertical traveltime, depth model using the unique seismic velocity for at least two drilling depths among the sequence of drilling depths, the unique vertical traveltime for the at least two drilling depths, and the at least two drilling depths;
determine a depth-domain surface seismic dataset using the time-domain surface seismic dataset and the vertical traveltime, depth model; and
revise the wellbore path based on the depth-domain surface seismic dataset;
wherein the drilling system is further configured to revise the orientation of the drill bit based on the revised wellbore path.

* * * * *